US005391602A

United States Patent [19]
Skoultchi

[11] Patent Number: 5,391,602
[45] Date of Patent: Feb. 21, 1995

[54] RADIATION-CURED PRESSURE SENSITIVE ADHESIVES

[75] Inventor: Martin Skoultchi, Somerset, N.J.

[73] Assignee: National Starch and Chemical Investment Holding Corporation, Bridgewater, N.J.

[21] Appl. No.: 160,017

[22] Filed: Nov. 30, 1993

[51] Int. Cl.⁶ .............................................. C08G 18/04
[52] U.S. Cl. .................... 524/392; 524/750; 522/90
[58] Field of Search .................. 524/392, 750; 522/90

[56] References Cited

U.S. PATENT DOCUMENTS

| | | | |
|---|---|---|---|
| 4,022,926 | 5/1977 | Keough et al. | 522/90 |
| 5,087,686 | 2/1992 | Ansell et al. | 522/90 |
| 5,187,235 | 2/1993 | Bordoloi et al. | 525/305 |
| 5,225,470 | 7/1993 | Mancinelli | 524/271 |

OTHER PUBLICATIONS

H. F. Huber et al. *Radiation Cured Polyesters for the Formulation of Pressure-Sensitive Adhesives* Radcure Europe 87, Conf. Proceedings (May 4–7, 1987) 8–35 to 8–53, Munich, Germany.

Primary Examiner—Maurice J. Welsh
Attorney, Agent, or Firm—Jane E. Gennaro

[57] ABSTRACT

Radiation-cured pressure-sensitive adhesives are provided comprising a radiation cured polyurethane backbone capped with both an acrylic or methacrylic reactive terminating group and residues of a mono-ol or polyol non-reactive terminating group. The adhesives include a functional amount of a thio compound which provides for improved control in pressure-sensitive adhesive properties when the adhesive precursor is irradiated.

8 Claims, No Drawings

RADIATION-CURED PRESSURE SENSITIVE ADHESIVES

FIELD OF THE INVENTION

This invention is directed to radiation curable compositions useful as pressure sensitive adhesives. The compositions are based on low molecular weight polyurethane oligomers containing both an acrylic or methacrylic reactive terminating group and residues of a mono-ol or polyol non-reactive terminating group. On exposure to radiation the curable compositions are converted into pressure-sensitive adhesives characterized by a desirable balance of aggressive tack and high-temperature hold.

BACKGROUND OF THE INVENTION

Radiation curable compositions which are curable to function as pressure-sensitive adhesives are known in the prior art. For example, liquid oligomer compositions (providing solventless coatings) containing unsaturated end groups can be coated on a substrate and cured rapidly by radiation such as electron beam or ultraviolet light radiation to form adhesive layers. In U.S. Pat. No. 4,022,926 to Keough et al. issued on May 10, 1977 a method is disclosed for making adhesive labels in which the adhesive and base layers are formed by radiation curing. The curable compositions for both layers according to that patent preferably comprise a polyurethane capped with residues of a hydroxyalkyl acrylate or methacrylate ester. The curable composition for the adhesive layer therein is prepared preferably by adding tackifying resins or agents to the curable compositions used for the base layer in order to obtain the needed adhesive properties.

In U.S. Pat. No. 5,087,686 to Ansell et al. issued on Feb. 11, 1992, radiation curable compositions for providing pressure-sensitive adhesives are described which comprise a polyurethane capped with residues of hydroxyalkyl acrylate or methacrylate which do not require the addition of tackifying resins or agents to obtain the needed adhesive properties in the cured composition. The improvements therein are based on formulating compositions to contain mono-alcohol residues which are saturated or contain unsaturated groups which do not polymerize with the acrylate or methacrylate residues when subjected to radiation. The non-polymerizable residues as used in that patent are residues which do not polymerize with isocyanate or unsaturated groups.

Known radiation curable pressure-sensitive adhesives available commercially will ordinarily favor tack, an important property in pressure-sensitive adhesives, at the expense of high temperature holding power. The invention described in the '686 patent to Ansell et al. lacks a commercially desirable balance of tack and high temperature holding power. Improved tack in typical pressure-sensitive adhesive formulations is obtained at the expense of poorer high temperature holding power. The formulations of the present invention provide adhesives with good tack and good or excellent holding power at high temperatures.

SUMMARY OF THE INVENTION

The present invention relates to radiation curable compositions based on low molecular weight polyurethane oligomers containing an acrylic or methacrylic reactive terminating group, and also containing a $C_2$–$C_{12}$ mono-ol or polyol terminating group and formulated with a mercaptan (thio compound) which allows for improved control in pressure-sensitive properties when the composition is irradiated. Additionally, the composition is preferably formulated to contain 2-ethyl-1,3-hexanediol as a comonomer (to react with the isocyanate) which because of its chemical structure tends to provide internal plasticizing properties to the cured adhesive.

The use of the mercaptan in the formulation serves to limit the degree of polymerization (crosslinking) during radiation cure of the curable composition. This control of molecular weight together with the use of 2-ethyl-1,3 hexanediol functioning as a copolymerized plasticizer system leads to pressure sensitive adhesives with improved properties that have not been obtained in the prior art. Such improved adhesive properties are evidenced notably by high peel strength which relates to aggressive high tack and high temperature hold performance.

In accordance with the invention, the low molecular weight adhesive coating is prepared by the polymerization of an excess of isocyanate and selected diol components according to known and commonly-used polymerization procedures. Useful ratios of isocyanate/diol (NCO/OH) herein will ordinarily fall between 1.3:1 to 1.7:1, and a ratio of about 1.5:1 is preferred. The oligomer is then reacted with hydroxyethyl acrylate or methacrylate employing an amount of the reactant to stoichiometrically provide an acrylate or methacrylate terminal group. The practitioner will recognize that other known methods may be used to introduce the acrylate or methacrylate group to the polyurethane backbone. The reaction product is further reacted with an alcohol selected from a $C_1$–$C_{12}$ alcohol, again employing an amount to provide a non-polymerizable mono-terminal group. While linear primary alcohols (mono-ols) are preferred, it will be recognized that diols or triols (e.g., glycerol) may also be used for this purpose. A mercaptan is post-added to the capped, curable polyurethane. The curable composition is thereafter coated onto a desired substrate, for example, silicone release coated paper, cloth or films, and thereafter the coated substrate is exposed to electron beam or ultraviolet radiation of wavelength 1800 to 4000 A for a period of time sufficient to initiate and complete polymerization. As is known in the art, when ultraviolet light (radiation) is employed photoinitiators such as benzoin or benzoin derivatives or benzophenone and its derivatives with suitable coinitiators must be included in the formulation.

DETAILED DESCRIPTION OF PREFERRED EMBODIMENTS

Among the suitable organic polyisocyanates (or mixtures) that may be used in this invention are included both aliphatic and aromatic polyisocyanates and, preferably, diisocyanates such as, for example, 1,5-naphthylene diisocyanate; isophorone diisocyanate; 4,4-diphenylmethane diisocyanate; 4,4'-diphenyldimethane diisocyanate,; di- and tetra- alkyldiphenylmethane diisocyanates such as 2,2'-dimethyl-4,4'-diphenylmethane and the like; 4,4'-dibenzyldiisocyanate; 1,3-phenylene diisocyanate; 1,4-phenylene diisocyanate; 2,4-tolylene diisocyanate; 2,6-tolylene diisocyanate; mixtures of 2,4- and 2,6-tolylene diisocyanate; 2,6-dichloro-1,4-para-xylene diisocyanate;

2,2'dichloro-4,4'-diisocyanato diphenylmethane; 2,4-dibromo-1,5-diisocyanato naphthalene; phosphorus containing isocyanates such as phenyl di-(4-isocyanatophenyl)-phosphate; butane-1,4-diisocyanate; hexane-1,6-diisocyanate; cyclohexane-1,4-diisocyanate; dicyclohexyl methane-4,4'-diisocyanate, and the like.

The liquid adhesives (oligomers) of the invention are prepared by reacting an excess of diisocyanate with a mixture of two or more diols to yield an isocyanate terminated oligomer. One of the diols is required to be 2-ethyl-1,3-hexane diol and will be included in an amount ranging from 10–80% of the total content of diol monomers. The other diol(s) can be selected from a large variety of diols known in the art. The diol(s) other than the plasticizing diol (2-ethyl-1,3 hexane diol) are selected to provide desired properties in the final adhesive.

Among suitable polyether diols are, for example, the condensation products of ethylene oxide, propylene oxide, butylene oxide, tetrahydrofuran and the copolymerization, graft or block polymerization products thereof such, for example, as mixed ethylene oxide, propylene oxide condensates as well as products prepared by reacting olefins under high radiation with the alkylene oxide condensates to prepare graft polymerization products. Polyethers are suitable which are prepared by condensation of the aforementioned alkylene oxides and polyhydric alcohols such as ethylene glycol, 1,2-propylene glycol and 1,4-butanediol.

Suitable polyester diols which are preferably saturated include polyester amides and polyamides obtained, for example, from saturated or unsaturated polycarboxylic acids and saturated and unsaturated polyhydric alcohols, diamines, polyamines and the like. Suitable carboxylic acids for preparing these polyesters include, for example, adipic acid, succinic acid, phthalic acid, tetephthalic acid, maleic acid and the like. Polyhydric alcohols useful in preparing the polyesters include, for example, ethylene glycol, 1,2-propylene glycol, 1,4-butanediol, neopentyl glycol, hexanediol, trimethylolpropane and the like. Aminoalcohols, for example, ethanol amine are also useful. Suitable diamines include diamines such as ethylene diamine, hexamethylene diamine and the like.

Suitable polyacetals, for example, can be prepared from 1,4-butanediol or hexanediol and formaldehyde. Suitable polythioethers are, for example, condensation products of thiodiglycol either alone or in combination with other glycols such as ethylene glycol, 1,2-propylene glycol or with other polyhydroxy compounds disclosed above.

Polyhydroxyl compounds which already contain urea or urethane groups as well as natural polyols which may be further modified if desired, for example, castor oil, carbohydrates and the like may also be used.

The preferred diols useful in this invention are polypropylene glycols and preferably are those which are available commercially and produced by the reaction of propylene oxide with water, ethylene glycol, or diethylene glycol in the presence of sodium hydroxide as a catalyst. These polypropylene glycols are characterized by the structure:

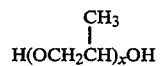

wherein x is equal to about 12 to about 90. These polypropylene glycols have molecular weights of from about 600 to about 5,000 and preferable glycols will have a weight of about 1,000–2,000. A polypropylene glycol which is homogeneous in molecular weight, or a mixture of polypropylene glycols which differ in molecular weight can be used. Those skilled in the art will readily see that small amounts of additional alkylene oxides may be copolymerized into the polypropylene glycol.

For some end-uses, functional monomers may be advantageously included in forming the polymerizable liquid polyurethane oligomer. Typical functional monomers which may be used herein include bis-hydroxy methyl propionic acid, and bis-hydroxy methyl propionamide. Those skilled in the art will recognize many other such functional monomers. When such optional comonomers are used, they will ordinarily be used in amounts not exceeding about 8% by weight of the total monomers.

The polymerization may be carried out with or without the use of typical urethane reaction catalysts such as are known to those in the art. These catalysts include dibutyl tin dilaurate and also stannous salts of carboxylic acids having from 2 to 18 carbon atoms, such as, for example, stannous laurate, stannous stearate, stannous acetate, stannous butyrate, stannous octoate and the like, and mixtures thereof. Other compounds which are suitable include dibutyl tin dimaleate, tributyl tin oxide dibutyl tin sulfide, lead resinate, salicylate, lead 2-ethyl hexoate, iron acetyl, cobalt benzoate, tetra (2-ethyl hexyl) titanate, tetra butyl titanate, and the like. Many other compounds may be used and the foregoing list is given only for purposes of illustration, not limitation.

The reactive oligomer reaction product is further reacted with hydroxyethyl acrylate or hydroxyethyl methacrylate and thereafter with an alcohol. The liquid oligomer, from a statistical viewpoint, is primarily composed of a mono-acrylate or mono-methacrylate terminated polyurethane copolymer which is also terminated at one end with an alkyl or substituted alkyl group which is not reactive to vinyl polymerizations. When such compositions are exposed to electron beam radiation or formulated with ultra-violet sensitizers and exposed to ultraviolet radiation a useful pressure-sensitive is still not formed because the molecular weight and the tack obtained on exposure of the described curable oligomer to radiation is not sufficiently controllable. A post-addition of a mercaptan into the liquid oligomer is required. The mercaptan provides a means of controlling molecular weight during the radiation-induced polymerization of the oligomer, enabling the practitioner to provide a pressure-sensitive adhesive having a controlled desirable balance of tack and high-temperature hold.

Typical mercaptans and thio compounds useful herein include thiosalicylic acid, dodecylmercaptan, mercaptosuccinic acid, thioglycollic acid, and mercaptopropionic acid. Ordinarily the mercapto compound will be employed in the liquid oligomer in amounts ranging from about 0.1 to 2.0 % by weight of the liquid oligomer, with preferred amounts ranging from about 0.3 to 1.0 % by weight. Larger amounts of the mercaptan (within the above range) will yield adhesives with relatively lower molecular weights showing aggressive tack at the expense of high temperature performance. Conversely, use of lower amounts of the mercaptan (within the above range) will yield adhesives with moderate tack but having improved high temperature performance. For the purposes of this invention "thio compound" or "mercapto compound" are meant to include mercaptan, mercapto compound, thio or dithio compound.

The substrates which can be coated using the curable liquid oligomer are such materials as synthetic polymers, e.g., nylon; plastic; treated polyolefins such as low-density polyethylene or oriented polypropylene films; polyvinylidene chloride-coated films such as PVDC-coated ethylene glycol dimethyl terephthalate (Mylar is the trademark), polyether and polyester urethane foams; aluminum foil; paper; metals; and other flexible substrates. It is to be noted that certain substrates which have surfaces which are inherently difficult to adhere, such as polyolefins, must be electrostatically treated (by corona discharge) before being coated to be suitable for the process herein. Typical end-use applications include lamination of films used in snack packages, vacuum pouches, unit packages, etc., and industrial laminations for the manufacture of insulating materials and automobile upholstery where pressure-sensitive adhesives may be used.

After coating of the curable composition onto a substrate, the composition is cured in usual manner by exposure to radiation such as ultraviolet light or electron beam radiation. The inclusion of a mercapto compound in the composition tends to prevent excessive crosslinking which is detrimental to good tack.

The following examples will illustrate the embodiments of the invention herein. In the examples, all parts and percentages are given by weight and all temperatures in degrees Celsius unless otherwise indicated.

EXAMPLE I

This example illustrates the preparation of a variety of capped polyurethane oligomer backbones useful in preparing the curable pressure-sensitive adhesive compositions of the invention.

The capped polyurethanes designated A–R in Table I were prepared as follows:

The indicated amount of the noted glycols, isophorone diisocyanate or other diisocyanate as noted, bis(-hydroxymethyl) propionic acid and a catalytic amount of dibutyltin dilaurate were charged to a one-liter flask equipped with thermometer, gas inlet tube, stirrer and addition funnel. A stream of dry nitrogen gas was led into the flask and maintained throughout the reaction. The mixtures were heated to the reaction temperature (about 90° C.) and maintained at that temperature for 3 hours.

TABLE I

| Composition | Glycol 1 | Parts | Glycol 2 | Parts | Acid (Parts) | Diisocyanate (Parts) | Hydroxyethyl Acrylate (Parts) | Alcohol (Parts) |
|---|---|---|---|---|---|---|---|---|
| A | PPG-2025 | 1.0M | 2-EHD | 1.0M | NONE | IPDI 3.00M | 1.0M | ethanol 1.0M |
| B | PPG-2025 | 1.0M | 2-EHD | 1.0M | 0.24M | IPDI 3.24M | 1.0M | ethanol 1.0M |
| C | PPG-2025 | 0.5M | 2-EHD | 1.5M | 0.24M | IPDI 3.24M | 1.0M | ethanol 1.0M |
| D | PPG-3025 | 1.0M | 2-EHD | 1.0M | 0.24M | IPDI 3.24M | 1.5M | propanol 1.5M |
| E | PPG-3025 | 1.0M | 2-EHD | 1.0M | 0.24M | IPDI 3.24M | 0.5M | butanol 0.5M |
| F | PPG-4025 | 1.0M | 2-EHD | 1.0M | 0.24M | IPID 3.24M | 1.0M | hexanol 1.0M |
| G | PPG-2025 | 1.0M | 2-EHD | 1.0M | 0.24M | *3.24M | 1.0M | n-octanol 1.0M |
| H | PPG-2025 | 1.0M | 2-EHD | 1.0M | 0.24M | MDI 3.24M | 1.0M | decanol 1.0M |
| I | PPG-2025 | 2.0M | NONE | — | 0.24M | MDI 3.24M | 1.0M | hexanol 1.0M |
| J | PPG-2025 | 1.0M | 2-EHD | 1.0M | 0.24M | MDI 3.24M | 1.0M | EG 1.0M |
| K | PPG-2025 | 1.0M | 2-EHD | 1.0M | 0.24M | MDI 3.24M | 1.0M | 2-EHD 1.0M |
| L | PPG-2025 | 1.0M | 2-EHD | 1.0M | 0.24M | MDI 3.24M | 1.0M | PPG-2025 1.0M |
| M | PPG-2025 | 1.0M | 2-EHD | 1.0M | 0.24M | MDI 3.24M | 1.0M | |
| N | PPG-2025 | 0.2M | 2-EHD | 1.8M | 0.24M | MDI 3.24M | 1.0M | PEG-200 1.0M |
| O | PPG-2025 | 1.0M | 2-EHD | 1.0M | 0.24M | MDI 3.24M | 1.0M | hexanol 1.0M |
| P | PPG-2025 | 1.0M | 2-EHD | 1.0M | 0.24M | MDI 3.24M | 1.0M | PPG-425 1.0M |
| Q | PPG-2025 | 1.0M | EG | 0.4M | NONE | *2.00M | 0.3M | glycerol 1.0M |
| R | PPG-3025 | 1.0M | 2-EHD | 1.0M | 0.24M | IPDI 3.24M | 1.0M | n-propanol 0.9M n-octanol 1.0M |

Q represents patent Example 1 from U.S. Pat. No. 5,087,686, run with minor variations — comparison example.
*diisocyante used was Hylene W, a hydrogenated MDI, supplied by E. I. duPont de Nemours
IPDI represents isophorone diisocyanate
MDI represents methylene-bis-phenyl diisocyante
PPG represents polypropylene glycol
2-EHD represents 2-ethyl-1,3-hexane diol
EG represents ethylene glycol
PEG represents polyethylene glycol Several representative capped polyurethane oligomers, prepared as described above, were further treated by the addition of a UV sensitizer, Darocure® 4265 employed at 2% by weight of the oligomer, and various thio compounds (mercaptans) at various concentrations as indicated in Table 2. For comparison purposes, three compositions were tested which contained no mercaptan or thio compound. Films (1 mil in thickness) of the curable compositions were cast on a Mylar® film substrate and covered with silicone-containing release paper. The adhesive films were then exposed to UV radiation employing a UV lamp system supplied by Fusion Systems Corp., Rockville, Md. 20855 employing a "D" bulb. The films were exposed through the Mylar film for two passes at a speed of 50 feet/minute which insured complete cure of the oligomer evidenced by the lack of any syrupy liquid on the adhesive surface.

Testing of the cured samples was run according to the following test procedures.

180° "Hold" Test—This test measures a combination of adhesive and cohesive properties. In conducting this test, films of the adhesives being evaluated are applied to a polyethylene terephthalate film backing in a 1 mil wet thickness and cured. The test samples, which are one inch in width and three inches in length, are securely adhered by thumb pressure to the bottom ½-inch of a chromesteel plate positioned in a vertical position and held at 70° C.; the dimensions of the adhered area being ½-inch by 1 inch. The portion of the sample that extends downward is folded back approximately 1 inch and a 500-gram weight is secured to its lower extremity. The time required for the sample to fail, that is, for the film to separate or delaminate from the bar, is recorded as the 180° hold time. It is advantageous to have little or no adhesive transfer with samples exhibiting a long "hold" time.

180° Peel Adhesion Test—This standard adhesion test, as described in ASTM D-1000, serves to measure the internal strength of the adhesive compositions of this invention. The samples are prepared in the manner described in the 180° "Hold" Test, above. The test consists of measuring the force necessary to strip or delaminate the adhesive test sample at a 180° angle from a stainless steel panel at a rate of pull of 12 inches per minute. An Instron Tensile Tester is used to provide the pulling force. Thus, the force necessary to effect delamination is recorded as the 180° peel force.

TABLE 2

| Composition | Thio compound (%) | 180° Peel (pli) | 180° Hold Test at 70° C. (hrs) |
|---|---|---|---|
| A | MP 0.6 | <1 | 0.5 |
| B | MS 0.8 | 3.5 | 24+ |
| B | DTDP 1.0 | 2.0 | 24+ |
| G | NONE | <1 | 0.5 |
| G | MP 0.3 | <1 | 24+ |
| G | MP 0.4 | 1.7 | 24+ |
| G | MP 0.6 | 2.8 | 24+ |
| H | MP 0.8 | <1 | 24+ |
| I | MP 0.6 | <1 | 0.5 |
| K | TS 0.6 | 3.0 | 24+ |
| K | MP 0.1 | 4.3 | 24+ |
| Q | NONE | 0 | <1 minute |
| R | NONE | <1 | 1 minute |
| R | MP 0.5 | 3.0 | 2.0 |

MP represents mercapto propionic acid
MS represents mercapto succinic acid
DTDP represents dithiodipropionic acid
TS represents thiosalicyclic acid Composition Q which is intended to repeat Example I from U.S. Pat. No. 5,087,686, with minor variations, shows no 180° peel strength and no useful pressure sensitive properties. Likewise, compositions G and R prepared with no mercaptan or thio compound show poor 180° peel strength while the addition of mercaptan to these compositions improves peel strength and the 180° hold test run at 70° C. Composition K employing 0.1% of mercapto propionic acid or 0.6% thiosalicyclic acid illustrates the improved results obtained on capping the polyurethane backbone with a diol. Composition I formulated with 0.6% of mercapto propionic acid shows relatively poorer performance with respect to the peel and high temperature hold test, believed to be caused by the absence of the softening diol, 2-ethyl-1,3-hexane diol. Two samples of composition B are prepared: one with 0.8% mercapto succinic acid and the other with 1% of dithiodipropionic acid with results indicating both types of sulfur compounds are effective here.

What is claimed is:

1. A radiation curable composition for providing a pressure-sensitive adhesive comprising a polyurethane backbone capped with an acrylic or methacrylic reactive terminating group and the residue of a mono-ol or polyol non-reactive terminating group, also containing a mercapto compound in an amount from about 0.1 to 2 percent by weight of the curable composition.

2. A composition according to claim 1 wherein the polyurethane backbone contains the polymerized residue of 2-ethyl-1,3-hexane diol comonomer.

3. A composition according to claim 1 wherein the acrylate or methacrylate terminating group is a $C_2$–$C_4$ alkyl acrylate or $C_2$–$C_4$ alkyl methacrylate.

4. A composition according to claim 2 wherein the polyurethane backbone comprises residues of a polyoxypropylene diol or a polyoxyethylene diol.

5. A pressure sensitive adhesive composition comprising a radiation cured polyurethane backbone capped with an acrylic or methacrylic reactive terminating group and the residue of a mono-ol or polyol non-reactive terminating group, also containing a mercapto compound in an amount from about 0.1 to 2 percent by weight of the composition.

6. A composition according to claim 5 wherein the polyurethane backbone contains the polymerized residue of 2-ethyl-1,3-hexane diol comonomer.

7. A composition according to claim 5 wherein the acrylate or methacrylate terminating group is a $C_2$–$C_4$ alkyl acrylate or $C_2$–$C_4$ alkyl methacrylate.

8. A composition according to claim 5 wherein the polyurethane backbone comprises residues of a polyoxypropylene diol or a polyoxyethylene diol and a terminating group comprising the residue of a polyol.

* * * * *